United States Patent
Zhao

(10) Patent No.: US 10,209,586 B2
(45) Date of Patent: Feb. 19, 2019

(54) ARRAY SUBSTRATE, DISPLAY PANEL HAVING THE SAME, AND METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Tingting Zhao, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 409 days.

(21) Appl. No.: 15/030,592

(22) PCT Filed: Dec. 10, 2015

(86) PCT No.: PCT/CN2015/097025
§ 371 (c)(1),
(2) Date: Apr. 20, 2016

(87) PCT Pub. No.: WO2016/206316
PCT Pub. Date: Dec. 29, 2016

(65) Prior Publication Data
US 2017/0168360 A1    Jun. 15, 2017

(30) Foreign Application Priority Data
Jun. 23, 2015  (CN) .......................... 2015 1 0350473

(51) Int. Cl.
*G02F 1/1362*  (2006.01)
*G02F 1/1333*  (2006.01)
(Continued)

(52) U.S. Cl.
CPC ...... *G02F 1/136204* (2013.01); *G02F 1/1339* (2013.01); *G02F 1/1345* (2013.01);
(Continued)

(58) Field of Classification Search
CPC ............. G02F 1/133351; G02F 1/1345; G02F 1/136204; G02F 1/136286;
(Continued)

(56) References Cited

U.S. PATENT DOCUMENTS

2006/0244892 A1  11/2006 Asai et al.
2006/0278929 A1  12/2006 Liu et al.
(Continued)

FOREIGN PATENT DOCUMENTS

CN  103034008 A  4/2013
CN  103676345 A  3/2014
(Continued)

OTHER PUBLICATIONS

Machine translation of Zhao Chinese Patent Document CN 103034008 A Apr. 10, 2013.*
(Continued)

*Primary Examiner* — Kevin J Comber
(74) *Attorney, Agent, or Firm* — Intellectual Valley Law, P.C.

(57) ABSTRACT

The present application discloses an array substrate comprising a base substrate; a plurality of peripheral wires on the base substrate; an insulating layer on a side of the plurality of peripheral wires distal to the base substrate; and an electrostatic charge conductive layer on a side of the insulating layer distal to the plurality of peripheral wires for conducting an electrostatic charge in the array substrate to ground.

20 Claims, 2 Drawing Sheets

(51) Int. Cl.
*G02F 1/1335* (2006.01)
*G02F 1/1339* (2006.01)
*G02F 1/1343* (2006.01)
*G02F 1/1345* (2006.01)

(52) U.S. Cl.
CPC .. *G02F 1/133345* (2013.01); *G02F 1/133351* (2013.01); *G02F 1/133514* (2013.01); *G02F 1/133516* (2013.01); *G02F 1/134309* (2013.01); *G02F 1/136286* (2013.01); *G02F 2001/136295* (2013.01); *G02F 2201/503* (2013.01)

(58) Field of Classification Search
CPC ......... G02F 1/134309; G02F 1/133516; G02F 1/133514; G02F 1/133345; G02F 1/1339; G02F 2201/503; G02F 2001/136295
USPC .......................................................... 361/56
See application file for complete search history.

(56) References Cited

U.S. PATENT DOCUMENTS

2008/0265250 A1   10/2008   Huang et al.
2011/0102719 A1*  5/2011   Kakehi ............. G02F 1/134363
                                                349/122
2012/0105776 A1   5/2012   Lin et al.
2015/0279867 A1*  10/2015  Yi .................... G02F 1/136286
                                                257/390

FOREIGN PATENT DOCUMENTS

| | | |
|---|---|---|
| CN | 103676378 A | 3/2014 |
| CN | 103926719 A | 7/2014 |
| CN | 104460070 A | 3/2015 |
| CN | 104704546 A | 6/2015 |
| CN | 104880880 A | 9/2015 |
| JP | 5418130 B2 | 2/2014 |
| TW | 201219935 A | 5/2012 |

OTHER PUBLICATIONS

The First Office Action in the Chinese Patent Application No. 201510350473.9, dated May 4, 2017; English translation attached.
The Second Office Action in the Chinese Patent Application No. 201510350473.9, dated Sep. 5, 2017; English translation attached.
International Search Report & Written Opinion dated Feb. 24, 2016 regarding PCT/CN2015/097025.

* cited by examiner

ARRAY SUBSTRATE, DISPLAY PANEL HAVING THE SAME, AND METHOD THEREOF

CROSS-REFERENCE TO RELATED APPLICATION

This application is a national stage application under 35 § 371 of International Application No. PCT/CN2015/097025 filed Dec. 10, 2015, which claims priority to Chinese Patent Application No. 201510350473.9, filed Jun. 23, 2015, the contents of which are incorporated by reference in the entirety.

FIELD

The present invention relates to display technology, more particularly, to an array substrate, a display panel having the same, and a manufacturing method thereof.

BACKGROUND

A liquid crystal display panel has an array substrate and a color filter substrate assembled together in a cell, and a liquid crystal layer sandwiched between the array substrate and the color filter substrate. Typically, the peripheral wires, the gate lines, and the data lines are disposed on the array substrate. When making a liquid crystal display panel, color filter substrate is cut along a cutting line for exposing metal wires disposed on the ends of the array substrate. The electrostatic charge generated by the color filter substrate cutting causes damages to the peripheral wires.

SUMMARY

In one aspect, the present invention provides an array substrate comprising a base substrate; a plurality of peripheral wires on the base substrate; an insulating layer on a side of the plurality of peripheral wires distal to the base substrate; and an electrostatic charge conductive layer on a side of the insulating layer distal to the plurality of peripheral wires for conducting an electrostatic charge in the array substrate to ground.

Optionally, at least a portion of the electrostatic charge conductive layer shielding the plurality of peripheral wires along a line for cutting a color filter substrate.

Optionally, the electrostatic charge conductive layer configured to shield the plurality of peripheral wires from an electrostatic charge generated when the color filter substrate is cut along the line for cutting the color filter substrate.

Optionally, the electrostatic charge conductive layer comprises a charge receiving portion and a charge conductive portion, the charge receiving portion receives an electrostatic charge in the array substrate, the charge conductive portion transmits the electrostatic charge received in the charge receiving portion to a ground wire.

Optionally, the charge receiving portion is disposed proximal to a projection of the line for cutting the color filter substrate.

Optionally, the charge receiving portion is facing the line for cutting the color filter substrate.

Optionally, the line for cutting the color filter substrate is aligned with a mid-line of the charge receiving portion on the array substrate.

Optionally, the charge receiving portion and the charge conductive portion are integrally formed as a single body.

Optionally, the charge receiving portion and the charge conductive portion are not connected.

Optionally, the charge receiving portion comprises a plurality of discharge tips, the charge conductive portion comprises a plurality of charge receiving tips, each of the plurality of discharge tips corresponds to each of the plurality of charge receiving tips in a one-to-one relationship.

Optionally, the charge receiving portion is disposed outside of an area enclosed by a sealant sealing the color filter substrate and the base substrate.

Optionally, the charge conductive portion is disposed within an area enclosed by a sealant sealing the color filter substrate and the base substrate.

Optionally, the charge conductive portion is connected to the ground wire through a via in the insulating layer.

Optionally, the electrostatic charge conductive layer comprises indium tin oxide.

Optionally, the array substrate further comprises a surface electrode layer comprising a plurality of electrodes, wherein the electrostatic charge conductive layer is disposed in the same layer as the surface electrode layer.

The present invention also provides a method of manufacturing a display panel. Optionally, the method includes providing an array substrate described herein; providing a color filter substrate; assembling the array substrate and the color filter substrate in a cell; and cutting the color filter substrate along a line for cutting the color filter substrate.

In another aspect, the present invention further provides a display panel comprising a color filter substrate assembled together in a cell with an array substrate described herein or manufactured by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION OF THE EMBODIMENTS

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
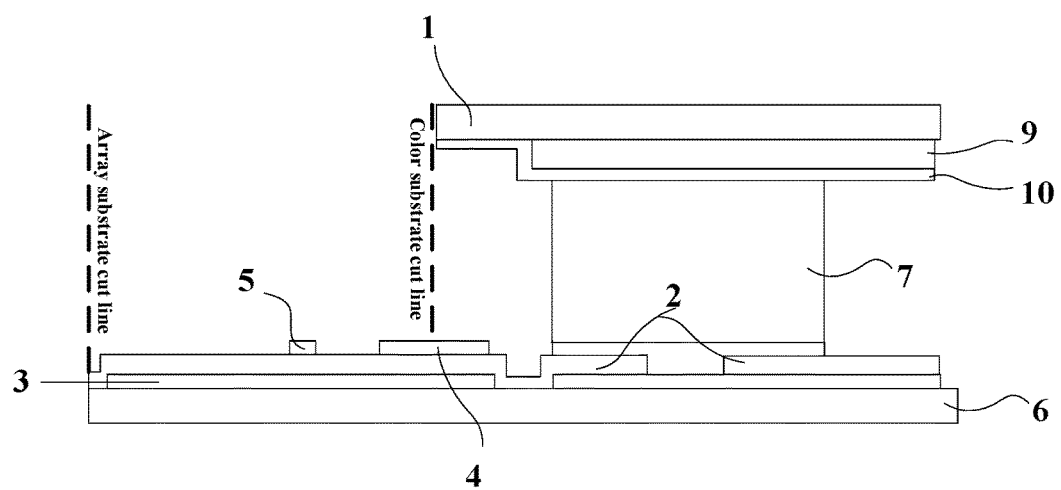
FIG. 1 is a diagram illustrating the structure of a display panel in an embodiment.

FIG. 1 is a diagram illustrating the structure of a display panel in an embodiment. Referring to FIG. 1, an array substrate of the display panel in the embodiment includes a base substrate 6, a plurality of peripheral wires 3 on the base substrate 6, an insulating layer 2 disposed on a side of the plurality of peripheral wires 3 distal to the base substrate 6, and an electrostatic charge conductive layer 4 disposed on a side of the insulating layer 2 distal to the plurality of peripheral wires 3. The electrostatic charge conductive layer 4 conducts the electrostatic charge in the array substrate to a ground wire 5. As shown in FIG. 1, the color filter substrate is cut along a color filter cut line, and the array substrate is cut along an array substrate cut line. The cutting along the color filter cut line cut only the color filter substrate, and does not cut any part of the array substrate. The cutting along the array substrate cut line cut the array substrate. Two cuttings can be performed sequentially or in parallel. For example, the array substrate may be cut first, or the color filter substrate may be cut first.

In making a liquid crystal display panel, color filter substrate is cut along a line for cutting color filter substrate (see "color filter cut line" FIG. 1) for exposing metal wires disposed on the ends of the array substrate. In some embodiments, at least a portion of the electrostatic charge conductive layer 4 shields the peripheral wires 3 from the line for cutting the color filter substrate when the array substrate is assembled together with the color filter substrate in a cell. For example, the electrostatic charge conductive layer 4 shields the peripheral wires 3 from an electrostatic charge generated when the color filter substrate is cut along the line for cutting the color filter substrate.

In some embodiments, the electrostatic charge conductive layer 4 includes a charge receiving portion 41 for receiving an electrostatic charge and a charge conductive portion 42 for conducting the electrostatic charge received by the charge receiving portion 41 to ground (e.g., a ground wire 5). The ground wire 5 is connected to a ground signal wire external to the array substrate. Other components in the array substrate may also be connected to ground via the ground wire 5. The peripheral wires 3 may include output contacts or input contacts.

In some embodiments, a portion of the electrostatic charge conductive layer 4 (e.g., the charge receiving portion 41) is disposed proximal to a projection of a line for cutting the color filter substrate 1 on the array substrate when the array substrate is assembled together with the color filter substrate in a cell. Optionally, the line for cutting the color filter substrate 1 is aligned with the mid-line of the charge receiving portion 41 in plan view of the array substrate. Optionally, the line for cutting the color filter substrate 1 is not aligned with the mid-line of the charge receiving portion 41, but the projection of the line for cutting the color filter substrate on the array substrate is within the area of the charge receiving portion 41. Optionally, the projection of the line for cutting the color filter substrate on the array substrate is at least partially within the charge receiving portion 41. Optionally, the charge receiving portion 41 is facing the line for cutting a color filter substrate 1.

In some embodiments, the electrostatic charge is generated by cutting the color filter substrate 1 along the line for cutting the color filter substrate, for example, due to the friction occurred during the cutting. The electrostatic conductive layer 4 is disposed on the side of the insulating layer 2 distal to the base substrate 6. Thus, the electrostatic conductive layer 4 can conduct the electrostatic charge to the ground wire 5 before it reaches the peripheral wires 3. Damages to the peripheral wires 3 can be prevented or minimized.

Figure 2:
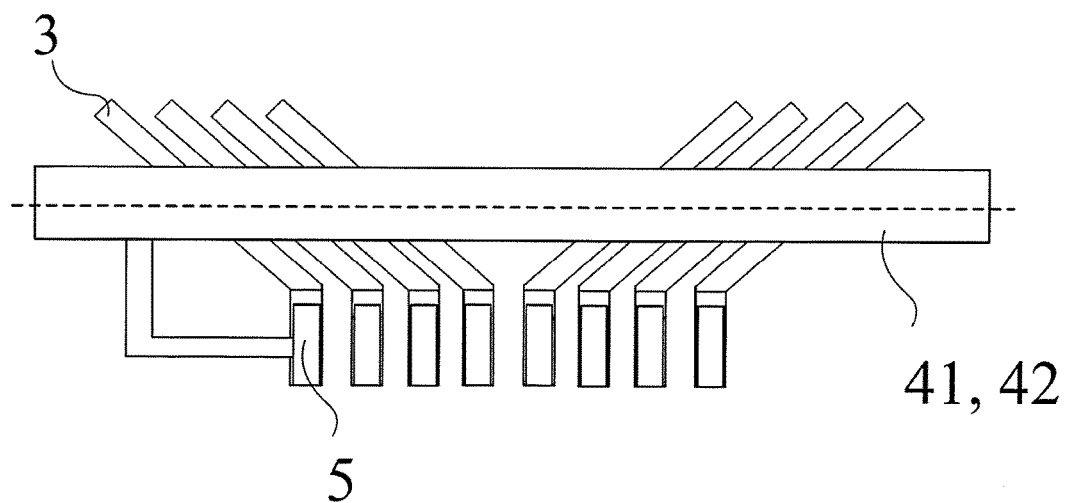
FIG. 2 is a diagram illustrating the structure of an electrostatic charge conductive layer comprising integrally formed a charge receiving portion and a charge conductive portion in an embodiment.

FIG. 2 is a diagram illustrating the structure of an electrostatic charge conductive layer 4 comprising integrally formed a charge receiving portion 41 and a charge conductive portion 42 in an embodiment. Referring to FIGS. 1 and 2, the charge receiving portion 41 and the charge conductive portion 42 in the embodiment are integrally formed as a single body. The charge receiving portion 41 receives an electrostatic charge, e.g., during the color filter cutting. The electrostatic charge received by the charge receiving portion 41 is directly transmitted to the charge conductive portion 42 because they are integrally formed in a single body. The charge conductive portion 42 is in turn connected to the ground wire 5. The electrostatic charge is dissipated to ground before it causes damages to the peripheral wires 3.

Figure 3:
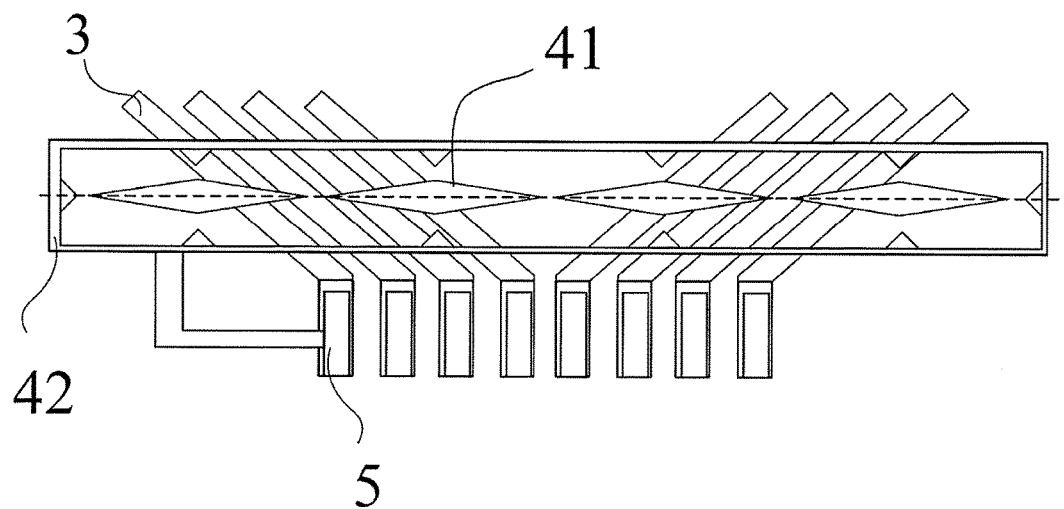
FIG. 3 is a diagram illustrating the structure of an electrostatic charge conductive layer comprising a plurality of discharge tips in an embodiment.

FIG. 3 is a diagram illustrating the structure of an electrostatic charge conductive layer 4 comprising a plurality of discharge tips in an embodiment. Referring to FIGS. 1 and 3, the charge receiving portion 41 includes a plurality of discharge tips, and the charge conductive portion 42 includes a plurality of charge receiving tips. Each of the discharge tips corresponds to each of the charge receiving tips in a one-to-one relationship. When the electrostatic charge in the charge receiving portion 41 accumulates to a certain level, the electrostatic charge is discharged through the discharge tips to the charge receiving tips in the charge conductive portion 42. Because the charge conductive portion 42 is connected to the ground wire 5, the electrostatic charge can be effectively dissipated to ground before it causes damages to the peripheral wires 3. In FIG. 3, the charge receiving portion 41 and the charge conductive portion 42 are not directly connected. The distances between the discharge tips and the charge receiving tips can be set to a predetermined value such that the electrostatic charge in the charge receiving portion 41 can be dissipated to ground before it reaches a predetermined level.

Optionally, the charge conductive portion 42 is connected to the ground wire 5 through a via in the insulating layer 2.

A sealant 7 seals the color filter substrate and the base substrate 6 together, and forms an enclosed area. Optionally, the charge receiving portion 41 is disposed outside of the enclosed area. Optionally, the charge conductive portion 42 is disposed within the enclosed area.

In some embodiments, the peripheral wires 3 are insulated from the charge receiving portion 41 by the insulating layer 2. The peripheral wires 3 are disposed on the base substrate 6. The insulating layer 2 is disposed on the peripheral wires 3, and the charge receiving portion 41 is then disposed on the insulating layer 2. Therefore, the peripheral wires 3 are disposed on a side of the charge receiving portion 41 proximal to the base substrate 6. The electrostatic charge is generated by cutting the color filter 1 along the line for cutting the color filter substrate. The electrostatic charge is transmitted through the charge receiving portion 41 to the charge conductive portion 42, and eventually to the ground wire 5. The charge conductive portion 42 is disposed within the area enclosed by the sealant 7. The charge conductive portion 42 is connected to the ground wire 5 through a via in the insulating layer 2. The electrostatic charge received by the charge receiving portion 41 is dissipated to ground before it reaches the peripheral wires 3. The electrostatic damages to the peripheral wires 3 can be prevented or minimized.

Any suitable conductive material may be used for making the electrostatic charge conductive layer 4. Optionally, a transparent conductive material is used for making the electrostatic charge conductive layer 4. Optionally, the electrostatic charge conductive layer 4 contains indium tin oxide.

Optionally, the array substrate further includes a surface electrode layer having a plurality of electrodes. Optionally, the electrostatic charge conductive layer 4 is disposed in the same layer as the surface electrode layer.

The present disclosure also provides a display panel having a color filter substrate 1 assembled together in a cell with an array substrate described herein. The display panel may further includes a black matrix 9 disposed on a side of the color filter substrate 1 proximal to the sealant 7. Optionally, a conductive layer 10 is disposed between the black matrix 9 and the sealant 7.

The present disclosure further provides a method of manufacturing a display panel. In some embodiments, the method includes providing an array substrate described herein, providing a color filter substrate, assembling the array substrate and the color filter substrate in a cell, and cutting the color filter substrate along a line for cutting the color filter substrate. In some embodiments, the method includes forming a pattern having the ground wire on the base substrate, forming a pattern having the plurality of peripheral wires on the base substrate, forming a pattern having the insulating layer disposed on the side of the plurality of peripheral wires distal to the base substrate, and having a pattern comprising the electrostatic charge conductive layer disposed on a side of the insulating layer distal to the base substrate. Optionally, the method further includes assembling the array substrate and the color filter substrate in the cell. Optionally, the method further includes cutting the color filter substrate along the cutting line. The electrostatic charge conductive layer conducts the electrostatic charge generated during the cutting to ground.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate comprising:
a base substrate;
a plurality of peripheral wires on the base substrate;
an insulating layer on a side of the plurality of peripheral wires distal to the base substrate; and
an electrostatic charge conductive layer on a side of the insulating layer distal to the plurality of peripheral wires for conducting an electrostatic charge in the array substrate to ground outside of an area enclosed by a sealant sealing a color filter substrate and the array substrate.

2. The array substrate of claim 1, wherein at least a portion of the electrostatic charge conductive layer shielding the plurality of peripheral wires along a line for cutting a color filter substrate.

3. The array substrate of claim 2, wherein the electrostatic charge conductive layer configured to shield the plurality of peripheral wires from an electrostatic charge generated when the color filter substrate is cut along the line for cutting the color filter substrate.

4. The array substrate of claim 1, wherein the electrostatic charge conductive layer comprises a charge receiving portion and a charge conductive portion, the charge receiving portion receives an electrostatic charge in the array substrate, the charge conductive portion transmits the electrostatic charge received in the charge receiving portion to a ground wire outside of the area enclosed by the sealant sealing the color filter substrate and the array substrate.

5. The array substrate of claim 4, wherein the charge receiving portion is disposed proximal to a projection of a line for cutting a color filter substrate.

6. The array substrate of claim 4, wherein the charge receiving portion is facing a line for cutting a color filter substrate.

7. The array substrate of claim 6, wherein the line for cutting the color filter substrate is aligned with a mid-line of the charge receiving portion on the array substrate.

8. The array substrate of claim 4, wherein the charge receiving portion and the charge conductive portion are integrally formed as a single body.

9. The array substrate of claim 4, wherein the charge receiving portion and the charge conductive portion are not connected.

10. The array substrate of claim 4, wherein the charge receiving portion comprises a plurality of discharge tips, the charge conductive portion comprises a plurality of charge receiving tips, each of the plurality of discharge tips corresponds to each of the plurality of charge receiving tips in a one-to-one relationship.

11. The array substrate of claim 4, wherein the charge receiving portion is disposed outside of the area enclosed by the sealant sealing the color filter substrate and the array substrate.

12. The array substrate of claim 4, wherein the charge conductive portion is disposed outside of the area enclosed by a sealant sealing the color filter substrate and the array substrate.

13. The array substrate of claim 4, wherein the charge conductive portion is connected to the ground wire through a via in the insulating layer.

14. The array substrate of claim 4, wherein the ground wire and at least a part of the charge conductive portion is in a region between a line for cutting the array substrate and a line for cutting a color filter substrate;
wherein the region between the line for cutting the array substrate and the line for cutting the color filter substrate is outside an area enclosed by a sealant sealing the color filter substrate and the base substrate.

15. The array substrate of claim 4, wherein the charge conductive portion is connected to the ground wire through a conductive connecting wire;

wherein the conductive connecting wire is in the region between the line for cutting the array substrate and the line for cutting the color filter substrate.

16. The array substrate of claim 4, wherein orthographic projections of the plurality of peripheral wires on the base substrate substantially cover an orthographic projection of the ground wire on the base substrate.

17. The array substrate of claim 1, wherein the electrostatic charge conductive layer comprises indium tin oxide.

18. The array substrate of claim 14, further comprising a surface electrode layer comprising a plurality of electrodes, wherein the electrostatic charge conductive layer is disposed in a same layer as the surface electrode layer.

19. A display panel comprising a color filter substrate assembled together in a cell with an array substrate of claim 1.

20. A method of manufacturing a display panel of claim 19, comprising:
  providing an array substrate of claim 1;
  providing a color filter substrate;
  assembling the array substrate and the color filter substrate in a cell; and
  cutting the color filter substrate along a line for cutting the color filter substrate.

* * * * *